United States Patent [19]
Marques Pereira et al.

[11] Patent Number: 5,929,918
[45] Date of Patent: Jul. 27, 1999

[54] EDGE-ORIENTED INTRA-FIELD/INTER-FIELD INTERPOLATION FILTER FOR IMPROVED QUALITY VIDEO APPLIANCES

[75] Inventors: Ricardo Alberto Marques Pereira, Cognola; Massimo Mancuso, Monza; Rinaldo Poluzzi, Milan, all of Italy

[73] Assignee: SGS-Thomson Microelectronics, S.r.l., Agrate Brianza, Italy

[21] Appl. No.: 08/801,950

[22] Filed: Feb. 12, 1997

[30] Foreign Application Priority Data

Feb. 13, 1996 [EP] European Pat. Off. ............... 96830061

[51] Int. Cl.$^6$ ....................................................... H04N 7/01
[52] U.S. Cl. ............................................ 348/448; 348/458
[58] Field of Search .................................. ; 348/446, 448, 348/458, 452, 441, 450, 581, 580, 616; H04N 7/01

[56] References Cited

FOREIGN PATENT DOCUMENTS

| 0 687 104 A2 | 12/1995 | European Pat. Off. | H04N 5/14 |
| 550231 | 7/1996 | European Pat. Off. | H04N 7/01 |
| 153562 | 6/1993 | Japan | H04N 7/01 |
| 153563 | 6/1993 | Japan | H04N 7/01 |
| 153169 | 5/1994 | Japan | H04N 7/01 |
| 163511 | 6/1996 | Japan | H04N 7/01 |

OTHER PUBLICATIONS

Tero Koivunen and Jouni Salonen, "Motion estimation using combined shape and edge matching", *Signal Processing Image Communication* 6(3): 241–252, 1994.

*Primary Examiner*—David E. Harvey
*Attorney, Agent, or Firm*—David V. Carlson; Brian L. Johnson; Seed and Berry LLP

[57] ABSTRACT

An interpolation filter for video signals includes four circuits to improve video quality in both intra-field and inter-field modes. The interpolation filter is configured to interpolate according to the direction of an image edge. The interpolation filter is also configured to interpolate in a prescribed spatial direction when no image edges can be univocally determined. The first circuit detects an image edge of discrete image elements to generate a first signal. The second circuit uses output from the first circuit to generate a first signal corresponding to an average of the discrete image elements along a direction of the image edge. The third circuit uses output from the first circuit to detect a texture image area wherein an image edge cannot be univocally determined and for generating a second signal depending on a degree of existence of the image edge. The fourth circuit is supplied by the first signal, the second signal and a third signal. The fourth circuit generates an output signal obtained by combining the first signal with the third signal in a proportion dependent upon the second signal. Additionally, the fourth circuit is configured for multiplexing to selectively couple the third signal to a fourth signal, corresponding to an average of the discrete image elements along a prescribed direction, or to a fifth signal corresponding to a previously received image element value.

22 Claims, 3 Drawing Sheets

EDGE-ORIENTED INTRA-FIELD/INTER-FIELD INTERPOLATION FILTER FOR IMPROVED QUALITY VIDEO APPLIANCES

TECHNICAL FIELD

The present invention relates to an edge-oriented inter-field/intra-field interpolation filter for improved quality video appliances, particularly for TV sets.

BACKGROUND OF THE INVENTION

It is known that the standard interlaced television (TV) signal has a sampled-in-time structure, because each frame is formed by two interlaced consecutive fields, each field being in turn composed of a given number of lines, e.g., even lines or odd lines.

The sampled structure of the TV signal is responsible for some problems. For example, problems known in the art as "raster visibility", "line flickering", "line crawling" are related to the interlaced structure of the TV signal, while problems like "field flickering" are related to the field frequency.

Known techniques for overcoming, or at least reducing these problems without changing the standard of the transmitted TV signal involves performing a digital signal processing at the receiver end.

Such techniques are substantially based on interpolation algorithms, and can be divided in two categories, namely Interlaced Progressive Conversion (IPC) and Field Rate Up-conversion (FRU). In the IPC technique, the number of lines for a field shown on the TV screen is doubled; for example, when an even field is received, odd lines are inserted between the even lines, the odd lines being obtained by interpolating the information content of two or more adjacent even lines. The same happens when an odd field is received. In the FRU technique, the number of fields shown per unit time on the TV screen is doubled with respect to the number of fields received per unit time. The circuits implementing these algorithms are called IPC filters or FRU filters, respectively.

The TV signal has two spatial dimensions, horizontal and vertical, and a time dimension. Taking account of this, both IPC and FRU interpolation algorithms can be further divided in two classes: two-dimension or intra-field algorithms and three-dimension or inter-field algorithms. Intra-field algorithms operate only on the two spatial dimensions of the TV signals, while inter-field algorithms use both the two spatial dimensions and the time dimension of the TV signal. Four classes of filters can thus be individuated: intra-field IPC or FRU filters, and inter-field IPC or FRU filters.

Intra-field and inter-field filters have different performance, but they also have different requirements in terms of practical implementation. For example, an inter-field IPC filter requires a buffer line memory for the current line data and a field memory containing data of the previous field, assuming that only the previous field is used for interpolation. The buffer line memory is necessary because the number of lines to be shown on the TV screen per unit time is twice the number of lines received per unit time. In an inter-field FRU filter, two field memories are necessary, namely a buffer field memory and a field memory for the previous field data. The buffer field memory is necessary because the number of fields shown on the TV screen per unit time is twice the number of received fields per unit time. Intra-field filters require less memory: an intra-field IPC filter does not require any field memory, while an intra-field FRU filter requires only one field memory, i.e., the buffer field memory.

Due to the technological limits of current integrated circuits manufacturing techniques, has not been possible to integrate in a same chip both the interpolation filter and the required memories, particularly when field memories must be provided; therefore, external memory chips must be provided. For example, a chip set for implementing an inter-field interpolation algorithm is formed by the filter chip and at least one field memory chip. These chips obviously increase the costs. Consequently, TV appliance manufacturers must choose the type of filter provided with the TV set in view of the cost, not only of the filter chip, but also of the required memory chips.

Also, commercially available filter chips are either of the intra-field or inter-field type: this increases inventory costs for the integrated circuit manufacturers and reduces design flexibility at the TV appliance manufacturer end.

SUMMARY OF THE INVENTION

In view of the state of the art described, it is an object of the present invention to provide an interpolation filter capable of operating in both the intra-field and inter-field modes.

According to the present invention, such object is achieved by means of an interpolation filter for video signals having the following elements: first circuit means supplied by discrete image elements for detecting an image edge; second circuit means supplied by the first circuit means for generating a first signal corresponding to an average of the discrete image elements along a direction of the image edge; third circuit means supplied by the first circuit means for detecting a texture image area wherein an image edge cannot be univocally determined and for generating a second signal depending on a degree of existence of the image edge; fourth circuit means, supplied by the first signal, the second signal and a third signal, for generating an output signal obtained by combining the first signal with the third signal in a proportion determined by the second signal; and multiplexing means controlled by a control signal for selectively coupling the third signal to fourth signal, corresponding to an average of the discrete image elements along a prescribed direction, or to a fifth signal corresponding to a previously received image element value.

The filter of the present invention is edge-oriented, because the spatial direction of interpolation is chosen according to the direction of an image edge, bright/dark edge such as, for example, an object contour. The filter of the present invention is also capable of detecting situations in which no image edges can be univocally determined, such in the case of texture image areas. In this case, interpolation is carried out in a prescribed spatial direction, for example the vertical direction.

The filter according to the present invention can operate as an intra-field filter or as an inter-field filter. In the first case, interpolation is carried out using the data of the current field only; in the second case, interpolation is carried out using the data of the current field and those of a previously received field.

BRIEF DESCRIPTION OF THE DRAWINGS

These and other features and advantages of the present invention will be made more evident by the following detailed description of one particular embodiment, illustrated as a non-limiting example in the annexed drawings.

DETAILED DESCRIPTION OF THE INVENTION

The embodiment described hereinbelow by way of example only relates to an interpolation filter capable of operating as an intra-field/inter-field IPC filter and as an intra-field/inter-field FRU filter.

Figure 1:
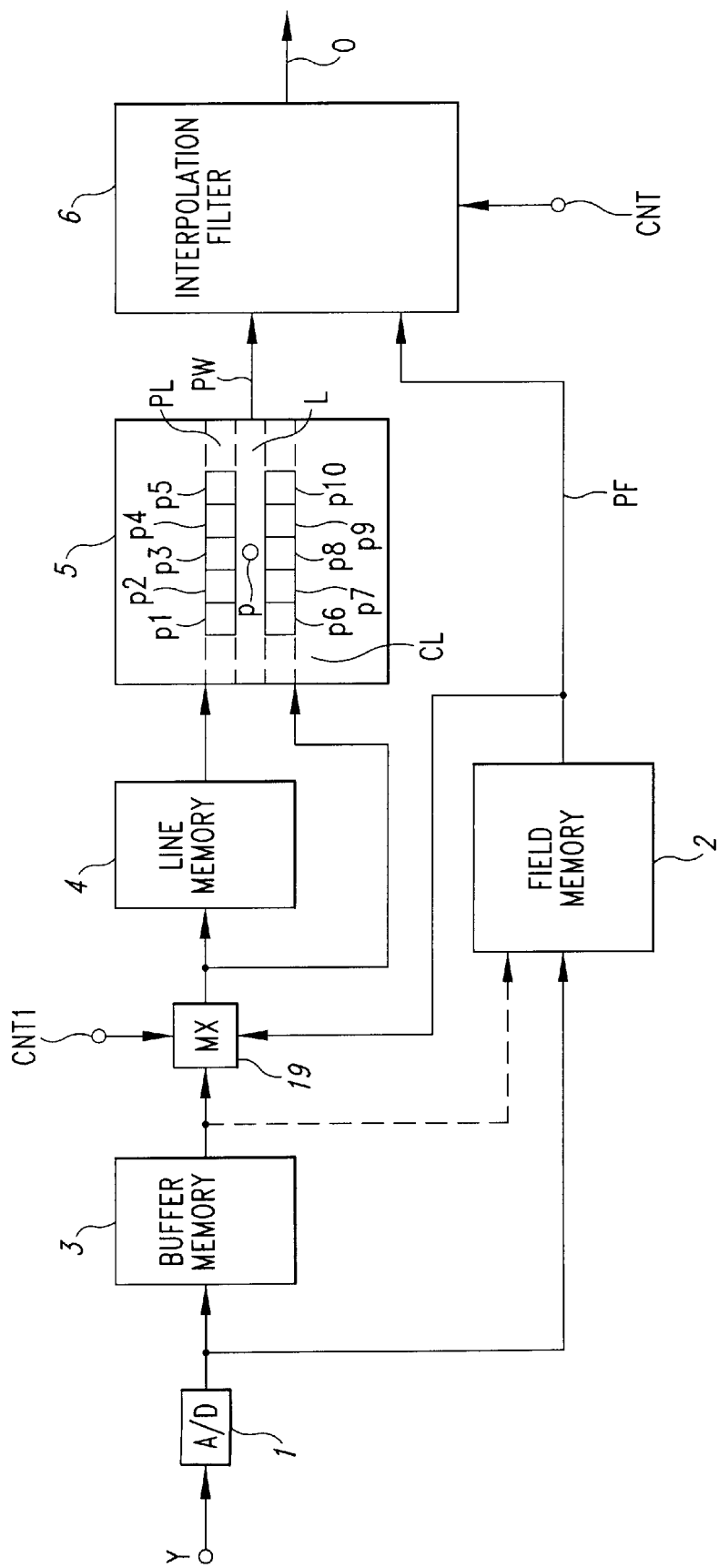
FIG. 1 is a schematic diagram showing the main building blocks of an interpolation filter set.

With reference to the drawings, FIG. 1 shows the main building blocks of an interpolation filter set. An A/D converter 1 receives an analog television signal Y, for example the luminance signal. As known, the analog signal Y comprises line data, line synchronism data and field synchronism data. A/D converter 1 digitally converts the line data contained in the analog signal Y into a succession of picture elements or pixels, each pixel being represented by a digital code; typically, an 8 bit A/D converter is used, allowing to discriminate between 256 gray levels.

A/D converter 1 supplies a first memory device 3 (buffer memory). If the filter to be implemented is an intra-field or inter-field IPC filter or an intra-field FRU filter, buffer memory 3 is a line memory capable of storing the pixel data of the current line. On the other hand, if an inter-field FRU filter is to be implemented, buffer memory 3 is a field memory capable of storing the pixel data of the current field. Buffer memory 3 supplies a first input of a multiplexer 19. A second memory device 2 is a field memory capable of storing the pixel data of an entire field. In the case of an intra-field IPC filter, field memory 2 is not necessary. In the case of an inter-field IPC filter or an intra-field FRU filter, field memory 2 is supplied directly by the output of A/D converter 1. In the case of an inter-field FRU filter, field memory 2 is supplied by the output of buffer memory 3 (as indicated by the dashed line in FIG. 1), and not by the output of A/D converter 1. Field memory 2, if necessary, supplies a second input PF of the multiplexer 19.

A control signal CNT1 allows to selectively couple an output of multiplexer 19 either to the output of buffer memory 3, in the case of an intra-field IPC filter or of an inter-field IPC filter, or to the output of field memory 2.

Supposing that A/D converter 1 has a sampling rate of 13.5 MHz, a 13.5 MHz data stream is provided at the output of A/D converter 1, while a 27 MHz data stream is provided at the output of buffer memory 3. In the case where the filter is an intra-field IPC, inter-field IPC or intra-field FRU filter, a 27 MHz data stream is provided at the output of field memory 2, while if the filter is an inter-field FRU filter, a 54 MHz data stream is provided at the output of field memory 2.

The output of multiplexer 19 supplies a third memory 4 (line memory) which is suitable to store the pixel data of the previously received line.

Line memory 4 and multiplexer 19 supply a circuit 5 for forming a sliding processing window. As known, the processing window is formed by a first subset of consecutive pixels of the previously received line of the current field and a second subset of consecutive pixels of the current line having the same position of the pixels of the first subset. In this example, a 5+5 pixel processing window is employed, comprising five pixels p1–p5 belonging to the previously received line PL and five pixels p6–p10 of the current line CL of the current field. In FIG. 1, p indicates the current pixel to be interpolated, i.e., one of the pixels belonging to the TV-screen line L interposed between lines PL and CL, line L does not belong to the current field. The processing window moves right along the direction of the lines one pixel at a time, to allow progressive interpolation of all the pixels of line L. It should be noted that smaller processing windows could be used, for example a 3+3 pixel one, but this has some disadvantages which will be described in the following.

The circuit 5, known per-se and therefore not shown in detail, comprises two shift registers of four cells of eight bits each, a first shift register being supplied by line memory 4 and a second shift register being supplied by buffer memory 3.

The output PW of circuit 5, i.e., the processing window, supplies an interpolation filter 6, which is also supplied with an output PF of field memory 2 which represents the data of pixel p in the previously received field. The output O of filter 6 represents the interpolated data of pixel p.

Figure 2:
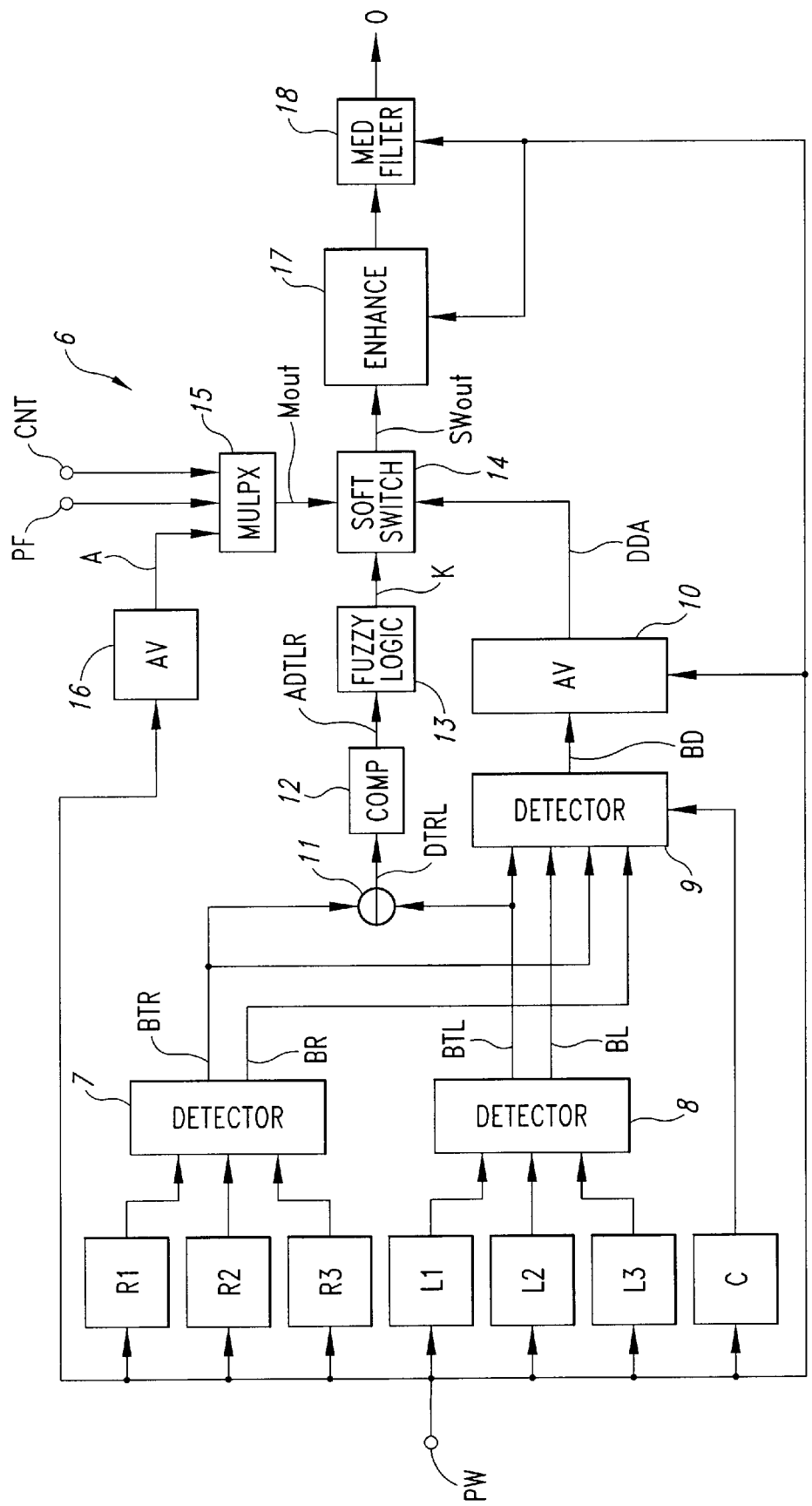
FIG. 2 is a schematic block diagram of an interpolation filter according to the present invention.

FIG. 2 shows the structure of the interpolation filter 6 which comprises seven circuit blocks R1–R3, L1–L3 and C. Blocks R1–R3, L1–L3 and C perform a measure of the degree of spatial correlation between the pixels p1–p10 of the processing window, to detect the presence of a bright/dark edge. Each block R1–R3, L1–L3 and C is associated to a particular spatial direction, as will be described in better detail later on.

The three blocks R1–R3 supply a first best direction detector circuit 7, and the three blocks L1–L3 supply a second best direction detector circuit 8. Each best direction detector 7 or 8 has three inputs for receiving the spatial correlation indexes calculated by blocks R1–R3 or L1–L3, respectively. In this example, the output of each block R1–R3, L1–L3 and C is a five-bit code. Each best direction detector 7 or 8 has two outputs. The first output BR, BL (two bits) indicates the direction of maximum spatial correlation among the directions associated to R1–R3 or L1–L3, respectively. The second output BTR, BTL (five bits) contains the measured value of spatial correlation along the direction of maximum spatial correlation among the directions associated to R1–R3 or L1–L3, respectively.

The outputs BR, BTR, BL and BTL of the best direction detectors 7 and 8 supplies a third best direction detector circuit 9, which is also supplied with an output of block C. Best direction detector 9 has an output BD, three bits in this example, indicating the direction of maximum spatial correlation among the directions associated to blocks R1–R3, L1–L3 and C.

The output BD of best direction detector 9 supplies a circuit 10 which is also supplied with the data of the pixels in the processing window PW. Circuit 10 performs an average of the pixel data along the direction of maximum spatial correlation, indicated by the signal BD.

The signals BTR and BTL also supply a digital subtractor 11 which performs a subtraction of the two measured values of maximum spatial correlation along the directions associated to blocks R1–R3 and L1–L3. An output DTLR of subtractor 11 supplies a circuit 12 for computing the absolute value of the difference between said two measured values of maximum spatial correlation.

An output signal ADTLR, five bits in this example, of circuit 12 supplies a fuzzy-logic circuit 13 which computes a value of a parameter K depending on the absolute value difference between the measured values of maximum spatial correlation along the directions associated to blocks R1–R3 and L1–L3.

The output K of circuit 13 supplies a first input of a soft-switch circuit 14. A second input of circuit 14 is supplied by an output DDA of circuit 10, and a third input of circuit 14 is supplied with an output Mout of a multiplexer 15. Multiplexer 15 has a first input supplied with the output PF of the field memory 2, a second supplied with an output supplied with an output A of a circuit 16 which performs an average of data of pixels p3 and p8 of the processing window, and a control input CNT allowing the multiplexer output Mout to be connected either to the input A or to the input PF of multiplexer 15.

An output SWout of circuit 14 supplies a brightness enhancement circuit 17 which eliminates the effects of attenuation of the high frequencies caused by the interpolation process; circuit 17 is supplied with the data of pixels p3 and p8 of the processing window. An output of circuit 17 supplies a median filter circuit 18, supplied with the data of the pixels p1–p10 of the processing window. The output of the median filter circuit 18 forms the output O of the interpolation filter 6, i.e., the interpolated value of pixel p.

The operation of the interpolation filter described hereabove will be now explained.

First of all, it is to be noted that an interpolation filter must not introduce artifacts in the interpolated image which could make the quality of the interpolated image worse than that of the original image. To this purpose, the interpolation algorithm must take into account the presence of bright/dark edges representing, for example, the contour of objects.

The interpolation filter of the present invention is edge-oriented in the sense that the value of pixel p to be interpolated is calculated by interpolating the values of adjacent pixels in the processing window along the direction of edges in the image.

Figure 3:
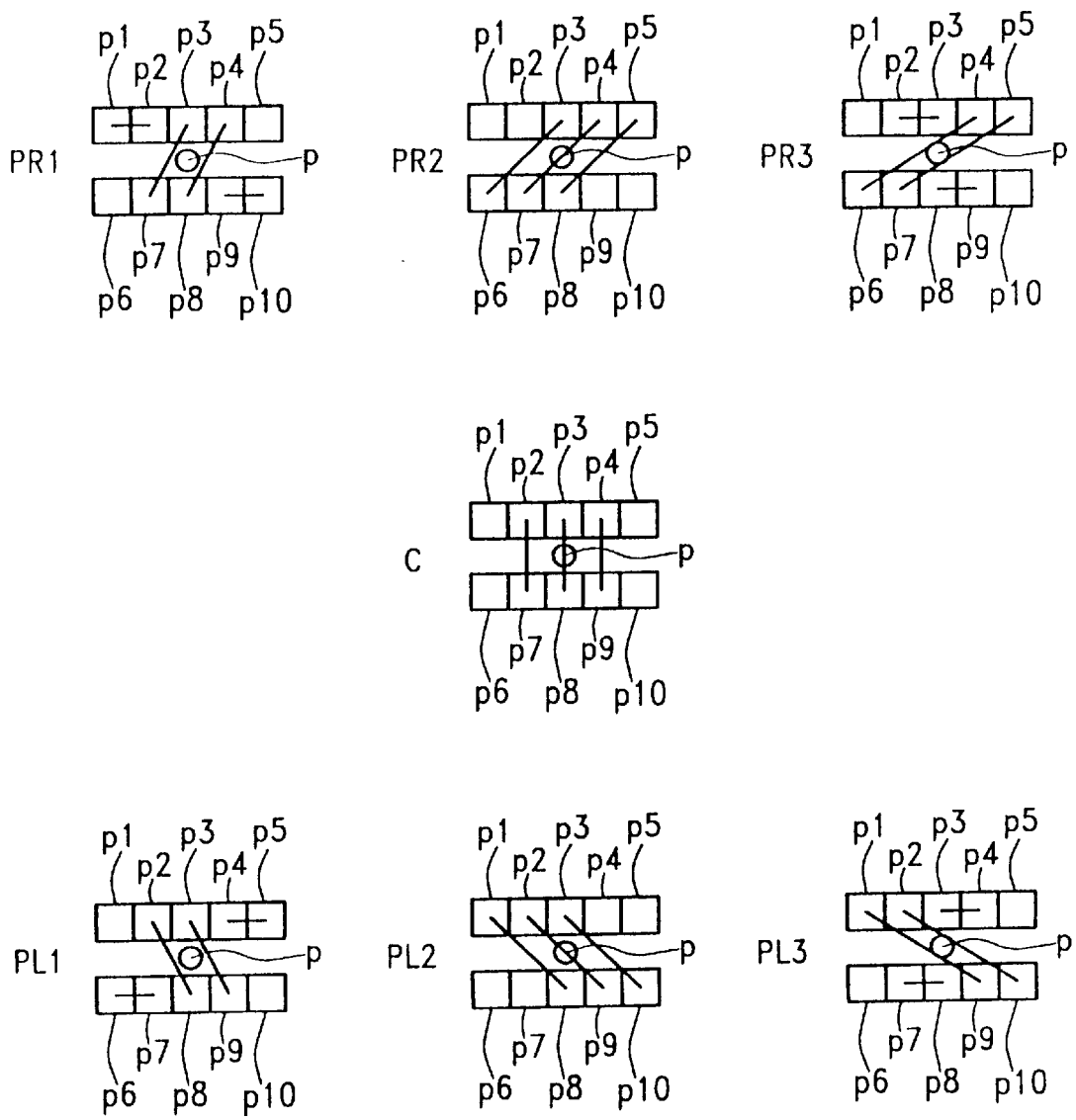
FIG. 3 shows a plurality of patterns for detecting directions of edges in an image.

FIG. 3 illustrates seven spatial correlation patterns PR1–PR3, PL1–PL3 and PC used to determine the direction of maximum spatial correlation between the pixels p1–p10. Patterns PR1–PR3 are right-direction patterns used to calculate the degree of spatial correlation along three differently slanting right directions, patterns PL1–PL3 are left-direction patterns used to calculate the degree of spatial correlation along three differently slanting left directions, and C is the center pattern used to calculate the degree of spatial correlation along the vertical direction. In the patterns of FIG. 3, a line connecting two pixels indicates a digital subtraction operation of the data of the two pixels.

Each one of the circuits R1–R3, L1–L3 and C evaluates the activation degree of a respective pattern performing the following arithmetic operations:

R1: $TGRADR1 = (|p3-p7|+|p4-p8|+|p2-p1|+|p9-p10|)/4$;

R2: $TGRADR2 = (2*|p4-p7|+|p3-p6|+|p5-p8|)/4$;

R3: $TGRADR3 = (|p4-p6|+|p5-p7|+|p3-p2|+|p9-p8|)/4$;

C: $TGRADC = (2*|p3-p8|+|p2-p7|+|p4-p9|)/4$;

L1: $TGRADL = (|p2-p8|+|p3-p9|+|p4-p5|+|p7-p6|)/4$;

L2: $TGRADL2 = (2*|p2-p9|+|p1-p8|+|p3-p10|)/4$;

L3: $TGRADL3 = (|p1-p9|+|p2-p10|+|p3-p4|+|p8-p7|)/4$.

TGRADR1–TGRADR3, TGRADC and TGRADL1–TGRADL3 represent the activation degree of patterns PR1–PR3, PC and PL1–PL3, respectively, i.e., the indexes of spatial correlation of pixels p1–p10 along slanted directions of approximately 34° (TGRADR3), 46° (TGRADR2), 64° (TGRADR1), 90° (TGRADC), 116° (TGRADL1), 136° (TGRADL2) and 146° (TGRADL3) with respect to the horizontal direction. The values TGRADR1 to TGRADR3 are supplied to the first best direction detector circuit 7, which determines the pattern with minimum activation degree among patterns PR1–PR3; in other words, circuit 7 performs the following arithmetic operation:

$TR = \min(TGRADR1, TGRADR2, TGRADR3)$.

In a similar way, the second best direction detector circuit 8 performs the following operation:

$BTL = \min(TGRADL1, TGRADL2, TGRADL3)$.

The third best direction detector circuit 9 determines the pattern with minimum activation degree among the seven patterns PR1–PR3, PL1–PL3 and PC, by evaluating the minimum value among BTR, BTL and TGRADC, i.e., circuit 9 performs the following arithmetic operation:

$\min(BTR, BTL, TGRADC)$.

The output BD of circuit 9 represents the pattern with minimum activation degree among the seven patterns PR1–PR3, PL1–PL3 and C: this pattern corresponds to the direction of maximum spatial correlation between the pixels in the processing window, i.e., the direction of a bright/dark edge, for example, a contour of an object.

Circuit 10 performs an average of the values (pixel gray levels) of the pixels in the processing window along the direction of maximum spatial correlation, indicated by the signal BD. In other words, circuit 10 interpolates the value of pixel p along the direction of maximum spatial correlation. The signal DDA, eight bits in this example, represents the average value of the pixels gray levels along the direction of maximum spatial correlation. The value of pixel p (to be interpolated) in the previously received field is not used to detect the presence of an image edge: this means that the detection of image edges is performed in intra-field mode.

It is worth noting that the use of a 5+5 pixels processing window allows to search for edges in seven different directions. A smaller processing window, for example of 3*3 pixels, allows to search for edges in only three different directions. Larger processing windows can obviously be employed.

If only the value calculated by circuit 10 were used to interpolate the value of pixel p, problems could arise in the texture areas of an image, wherein due to the absence of the central pixel or because of motion it is impossible to determine the correct interpolation direction. To avoid these problems, the interpolation filter comprises a texture detection circuit formed by the subtractor 11, the circuit 12 and the fuzzy-logic circuit 13.

First of all, it is to be observed that such undecidable situations can be detected when the values of TGRADR1–TGRADR3 and TGRADL1–TGRADL3 are almost equal, because in these cases there is no evidence of a bright/dark edge in the image. This condition is detected by means of circuits 11 and 12, which perform the following operation:

$ADTLR = |\min(TGRADR1, TGRADR2, TGRADR3) - \min(TGRADL1, TGRADL2, TGRADL3)|$.

The fuzzy-logic circuit 13 calculates the value of a parameter K according to the value of the signal ADTLR. The value of K is a non-linear function of the value of ADTLR, and varies between 0 and 1. When ADTLR is high, i.e., when a direction of maximum spatial correlation can be clearly detected, K is approximately equal to 0. When ADTLR is low, in particular zero, K is approximately equal to 1. The non-linear curve representing the dependence of K on ADTLR is implemented by means of fuzzy-logic techniques.

Soft-switch circuit 14 mixes the values of DDA and Mout according to the value of K, in the following way:

$$SWout=K*Mout+(1-K)*DDA.$$

The signal CNT selects the operation mode of the interpolation filter 6. In a first operation mode, the filter 6 acts as an intra-field IPC or FRU interpolation filter and the output of multiplexer 15 is represented by the signal A which is the average, in the vertical direction, of the values of pixels p3 and p8 in the processing window. The value of A is computed by circuit 16. In this operation mode, SWout is driven by:

$$SWout=K*(p3+p8)/2+(1-K)*DDA.$$

For K=0, SWout=DDA, i.e., the average value of the pixel gray levels along the estimated direction of maximum spatial correlation, For K=1, SWout=(p3+p8)/2, i.e., when there is no evidence of a bright/dark edge in the image, the vertical direction of interpolation is preferred. For K comprised between 0 and 1, a weighted average between DDA and (p3+p8)/2 is calculated.

In a second operation mode, the filter 6 can operate as an inter-field IPC or FRU interpolation filter and the output of multiplexer 15 is represented by PF, i.e., the value of pixel p in the previously received field, stored in the field memory 2. In this operation mode, SWout is given by:

$$SWout=K*PF+(1-K)*DDA.$$

Circuit 17 allows to enhance the brightness of the image by peaking in the vertical direction, thus compensating the attenuation of high frequency components caused by the interpolation.

The output of the median filter 18 gives the interpolated value of pixel p.

The interpolation filter can thus operate as an intra-field filter or as an inter-field filter. A TV set manufacturer can choose the more suitable operation mode by setting the signal CNT. Obviously, when the filter must operate as an intra-field filter the field memory 2 is not necessary, so that the costs are lower than in the case the filter is operated as an inter-field filter.

The individual components of the A/D converter 1, buffer memory 3, field memory 2, line memory 4, multiplexers 15 and 19, are all known in the art. Similarly, the individual circuits R1–R3, L1–L3 and C for measuring the degree of spatial correlation between the pixels p1–p10, direction detectors 7–9, circuit 10 for averaging the values of pixels in the process window, digital subtractor 11, circuit 12 for providing an absolute value of a measure value, fuzzy-logic circuit 13, soft-switch circuit 14, circuit 16 for averaging data of two pixels, circuit 17 for eliminating the effects of attenuation of high frequencies, and median filter circuit 18 can be realized using circuits of the type that are well known in the art, based on the description herein. The present invention is directed towards the combination of these individual components into a new circuit. The internal details of these components do not constitute this invention and any suitable circuits to obtain these individual components are acceptable. A person of skill in the art would be able to use such known circuits to provide the requested signals based on the disclosure of the present invention.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. An interpolation filter for video signals, comprises:
    first circuit means supplied by discrete image elements for detecting an image edge;
    second circuit means supplied by said first circuit means for generating a first signal corresponding to an average of said discrete image elements along a direction of said image edge;
    third circuit means supplied by said first circuit means for detecting a texture image area wherein an image edge cannot be univocally determined and for generating a second signal depending on a degree of existence of the image edge;
    fourth circuit means, supplied by said first signal, said second signal and a third signal, for generating an output signal obtained by combining the first signal with the third signal in a proportion determined by the second signal;
    multiplexing means controlled by a control signal for selectively coupling said third signal to fourth signal, corresponding to an average of said discrete image elements along a prescribed direction, or to a fifth signal corresponding to a previously received image element value.

2. The interpolation filter according to claim 1 wherein said first circuit means comprises a plurality of spatial correlation detector circuits supplied with said discrete image elements, each spatial correlation detector circuit calculating a respective index of spatial correlation between said discrete image elements along a respective associated spatial direction.

3. The interpolation filter according to claim 2 wherein said first circuit means comprise fifth circuit means supplied with said indexes of spatial correlation for determining a direction of maximum spatial correlation between the discrete image elements.

4. The interpolation filter according to claim 3 wherein said second circuit means are supplied with a sixth signal corresponding to said direction of maximum spatial correlation and calculate an average of said discrete image elements along said direction of maximum spatial correlation.

5. The interpolation filter according to claim 4 wherein said fifth circuit means comprise a first best direction detector circuit supplied by a first group of spatial correlation detector circuits associated to right-slanted spatial directions slanted in the right direction and calculating a first direction of maximum spatial correlation among the right-slanted spatial directions, a second best direction detection circuit supplied by a second group of spatial correlation detector circuits associated to left-slanted spatial directions and calculating a second direction of maximum spatial correlation among the left-slanted spatial directions, and a third best direction detector circuit supplied by the first and second best direction detector circuits and by a spatial correlation detector circuit associated to the vertical spatial direction and calculating the direction of maximum spatial correlation among all the right-slanted, left-slanted and vertical spatial directions.

6. The interpolation filter according to claim 5 wherein said discrete image elements belongs to a processing window comprising a first plurality of consecutive image elements belonging to a previously received image line and a second plurality of consecutive image elements belonging to a current image line.

7. The interpolation filter according to claim 6 wherein said first plurality of image elements comprises five image elements and said second plurality of image elements comprises five image elements, each image element having a value represented by a respective digital code.

8. The interpolation filter according to claim 7 wherein said first group of spatial correlation detector circuits comprises three correlation detector circuits for calculating indexes of spatial correlation along directions slanted of approximately 64°, 46° and 34°, respectively, with respect to an horizontal direction, and said second group of spatial correlation detector circuits comprises three correlation detector circuits for calculating indexes of spatial correlation along directions slanted of approximately 116°, 136° and 146°, respectively, with respect to said horizontal direction.

9. The interpolation filter according to claim 8 wherein:

said first plurality of image elements comprises a first, a second, a third, a fourth and a fifth image elements;

said second plurality of image elements comprises a sixth, a seventh, an eighth, a ninth and a tenth image elements;

said first group of spatial correlation detector circuits comprises a first, a second and a third correlation detector circuits;

said second group of spatial correlation detector circuits comprises a fourth, a fifth and a sixth correlation detector circuits;

the first, second, third, fourth, fifth, sixth correlation detector circuits and the vertical-direction correlation detector circuit respectively performing the following arithmetic operations:

$(|p3-p7|+|p4-p8|+|p2-p1|+|p9-p10|)/4;$ $(2*|p4-p7|+|p3-p6|+|p5-p8|)/4;$ $(|p4-p6|+|p5-p7|+|p3-p2|+|p9-p8|)/4;$ $(|p2-p8|+|p3-p9|+|p4-p5|+|p7-p6|)/4;$ $(2*|p2-p9|+|p1-p8|+|p3-p10|)/4;$ $(|p1-p9|+|p2-p10|+|p3-p4|+|p8-p7|)/4.$ $(2*|p3-p8|+|p2-p7|+|p4-p9|)/4;$ wherein p1, p2, p3, p4, p5, p6, p7, p8, p9 and p10 represents data of the first, second, third, fourth, fifth, sixth, seventh, eighth, ninth and tenth image elements, respectively.

10. The interpolation filter according to claim 5 wherein said third circuit means comprises a subtractor circuit for calculating a difference between the indexes of spatial correlation of the first and the second directions of maximum spatial correlations, an absolute-value circuit for calculating an absolute value of said difference, and a fuzzy-logic computation unit for calculating a value of said second signal according to a value of said absolute value.

11. The interpolation filter according to claim 10 wherein said fuzzy-logic computation unit calculates the value of the second signal according to a non-linear curve varying between 0 and 1, the value of said second signal being substantially equal to 0 when said absolute value is high and substantially equal to 1 when said absolute value is substantially equal to 0.

12. The interpolation filter according to claim 11 wherein said fourth circuit means comprises a soft-switch circuit generating the output signal with a value equal to the value of the third signal multiplied by the value of the second signal, plus the value of the first signal multiplied by 1 minus the value of the second signal.

13. The interpolation filter according to claim 12 wherein said fourth signal is generated by a vertical average circuit calculating an average of the discrete image elements in the vertical direction.

14. The interpolation circuit according to claim 1, further includes brightness enhancement means supplied by said output signal for enhancing the brightness of the image.

15. The interpolation filter according to claim 14, further includes a median filter supplied by the brightness enhancement means.

16. A method for filtering image signals comprising the steps of:

digitally-converting an image signal in discrete image elements;

determining a spatial direction corresponding to an image edge;

calculating a first average value of the discrete image elements along said spatial direction;

determining a second value indicating a degree of correspondence of the image signal to a texture image area wherein an image edge cannot be univocally determined;

calculating an interpolated value by combining said first average value and a third value in a proportion determined by said second value, said third value being in alternative equal to a fourth average value along a prescribed spatial direction or to a fifth value of a discrete image element previously received.

17. The method according to claim 16, further includes the step of defining a processing window comprising a first plurality of discrete image elements belonging to a previously received image line, and a second plurality of discrete image elements belonging to a current image line, and calculating a direction of maximum spatial correlation between said first and second pluralities of discrete image elements.

18. The method according to claim 17 wherein said direction of maximum spatial correlation is determined by calculating indexes of spatial correlation along directions slanted of approximately 34°, 46°, 64°, 90°, 116°, 136° and 146° with respect to an horizontal direction, and comparing said indexes of spatial correlation to determine the minimum among them.

19. The method according to claim 17 wherein:

said first plurality of image elements comprises a first, a second, a third, a fourth and a fifth image elements;

said second plurality of image elements comprises a sixth, a seventh, an eighth, a ninth and a tenth image elements;

said indexes of spatial correlation comprises seven indexes of spatial correlation calculated respectively performing the following arithmetic operations:

$(|p3-p7|+|p4-p8|+|p2-p1|+|p9-p10|)/4;$ $(2*|p4-p7|+|p3-p6|+|p5-p8|)/4;$ $(|p4-p6|+|p5-p7|+|p3-p2|+|p9-p8|)/4;$ $(|p2-p8|+|p3-p9|+|p4-p5|+|p7-p6|)/4;$ $(2*|p2-p9|+|p1-p8|+|p3-p10|)/4;$ $(|p1-p9|+|p2-p10|+|p3-p4|+|p8-p7|)/4.$ $(2*|p3-p8|+|p2-p7|+|p4-p9|)/4;$ wherein p1, p2, p3, p4, p5, p6, p7, p8, p9 and p10 represents data of the first, second, third, fourth, fifth, sixth, seventh, eighth, ninth and tenth image elements, respectively.

20. The method according to claim 18 wherein said second value is determined by calculating a difference value between the minimum index of spatial correlation among the indexes associated to the directions slanted of 34°, 46° and 64°, and the minimum index of spatial correlation among the indexes associated to the directions slanted of 116°, 136° and 146°.

21. The method according to claim 20 wherein said second value is determined by means of a fuzzy-logic calculation according to said difference value.

22. The method according to claim 21 wherein said prescribed spatial direction is the vertical direction.

* * * * *